(12) United States Patent
Gonze et al.

(10) Patent No.: US 8,631,645 B2
(45) Date of Patent: Jan. 21, 2014

(54) THERMAL MANAGEMENT SYSTEMS FOR EFFICIENT LEAN OPERATING ENGINES

(75) Inventors: Eugene V. Gonze, Pinckney, MI (US); Halim G. Santoso, Novi, MI (US); Bruce F. Hunter, Okemos, MI (US)

(73) Assignee: GM Global Technology Operations LLC

( * ) Notice: Subject to any disclaimer, the term of this patent is extended or adjusted under 35 U.S.C. 154(b) by 308 days.

(21) Appl. No.: 13/038,649

(22) Filed: Mar. 2, 2011

(65) Prior Publication Data

US 2012/0222408 A1 Sep. 6, 2012

(51) Int. Cl.
*F01N 3/00* (2006.01)
*F01N 3/10* (2006.01)

(52) U.S. Cl.
USPC ............... 60/285; 60/286; 60/300; 60/301

(58) Field of Classification Search
USPC ............... 60/284–286, 295, 299–301, 303
See application file for complete search history.

(56) References Cited

U.S. PATENT DOCUMENTS

| 2008/0314028 A1* | 12/2008 | Christner et al. | 60/286 |
| 2009/0293450 A1* | 12/2009 | Gonze et al. | 60/274 |
| 2010/0139248 A1* | 6/2010 | Najt et al. | 60/285 |

* cited by examiner

*Primary Examiner* — Kenneth Bomberg
*Assistant Examiner* — Audrey K Bradley (57) ABSTRACT

A thermal management system includes a catalytic converter module that determines whether a catalytic converter is active. A selective catalytic reduction (SCR) catalyst module determines whether a SCR catalyst is active. An engine control module adjusts an air and fuel ratio of an engine to operate at a stoichiometric ratio and retards spark of the engine when the catalytic converter is not active. The engine control module at least one of performs post fuel injection and directly injects fuel into an exhaust system of the engine when the catalytic converter is active and the SCR catalyst is not active.

20 Claims, 4 Drawing Sheets

THERMAL MANAGEMENT SYSTEMS FOR EFFICIENT LEAN OPERATING ENGINES

FIELD

The present disclosure relates to vehicle exhaust systems, and more particularly to thermal management systems that maintain active temperatures of exhaust components.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During a combustion cycle of an internal combustion engine (ICE), air/fuel mixtures are provided in cylinders of the ICE. The air/fuel mixtures are compressed and combusted to provide output torque. After combustion, pistons of the ICE force exhaust gases in the cylinders out through exhaust valve openings and into an exhaust system. The exhaust gases may contain oxides of nitrogen ($NO_x$) and carbon monoxide (CO) and hydrocarbons (HCs).

An exhaust gas treatment system of the ICE may include a catalytic converter and a selective catalytic reduction (SCR) catalyst to reduce exhaust emissions. As an example, a theeway catalyst converter (TWC) may be used to reduce $NO_x$, CO and HCs within an exhaust system. The TWC converts $NO_x$ to nitrogen and oxygen, CO to carbon dioxide and oxidizes unburnt HCs to produce carbon dioxide and water. A SCR catalyst may be located downstream from the TWC and may further reduce $NO_x$ in the exhaust system. A SCR catalyst converts $NO_x$ into nitrogen $N_2$ and water $H_2O$.

An average light-off temperature at which a catalytic converter typically begins to function is approximately 200-350° C. An average temperature above which a SCR catalyst is active is also approximately 200-350° C. As a result, a catalytic converter and a SCR catalyst do not function or provide minimal emission reduction when their temperatures are not maintained at or above respective light-off and/or minimum active operating temperatures.

In order to increase and maintain temperatures of the catalytic converter and the SCR catalyst at or above the light-off and/or minimum active operating temperatures, lean operation of an ICE is limited. An ICE may be operated with a lean air/fuel ratio to minimize fuel consumption and improve operating efficiency of the ICE. The leaner the ICE is operated, the less fuel consumed and the more efficient the ICE operates.

However, the leaner the ICE is operated, the lower the operating temperatures of the ICE, which decreases the amount of thermal energy transfer to exhaust system components. As thermal energy to the exhaust system decreases, the temperatures of the catalytic converter and SCR catalyst can decrease to below active operating temperatures. For this reason, lean operation is limited to maintain catalytic converter and SCR catalyst operating temperatures above active operating temperatures. Limiting lean operation limits the amount of reduction in fuel consumption.

SUMMARY

A thermal management system includes a catalytic converter module that determines whether a catalytic converter is active. A selective catalytic reduction (SCR) catalyst module determines whether a SCR catalyst is active. An engine control module adjusts an air and fuel ratio of an engine to operate at a stoichiometric ratio and retards spark of the engine when the catalytic converter is not active. The engine control module at least one of performs post fuel injection and directly injects fuel into an exhaust system of the engine when the catalytic converter is active and the SCR catalyst is not active.

In other features, a thermal control method is provided and includes determining whether a catalytic converter and a SCR catalyst are active. An air and fuel ratio of an engine is adjusted to operate at a stoichiometric ratio and spark of the engine is retarded when the catalytic converter is not active. At least one of post fuel injection is performed and fuel is directly injected into an exhaust system of the engine when the catalytic converter is active and the SCR catalyst is not active.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, tasks, operations, elements, and/or components, but do not preclude the presence or addition of one or more other features, tasks, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, and/or devices, these elements, components, and/or devices should not be limited by these terms. These terms may be only used to distinguish one element, component, or device from another element, component, or device. Terms such as "first," "second," and other numerical terms when used herein do not imply a sequence or order unless clearly indicated by the context. Thus, a first element, component, or device discussed below could be termed a second element, component, or device without departing from the teachings of the example embodiments.

Figure 1:
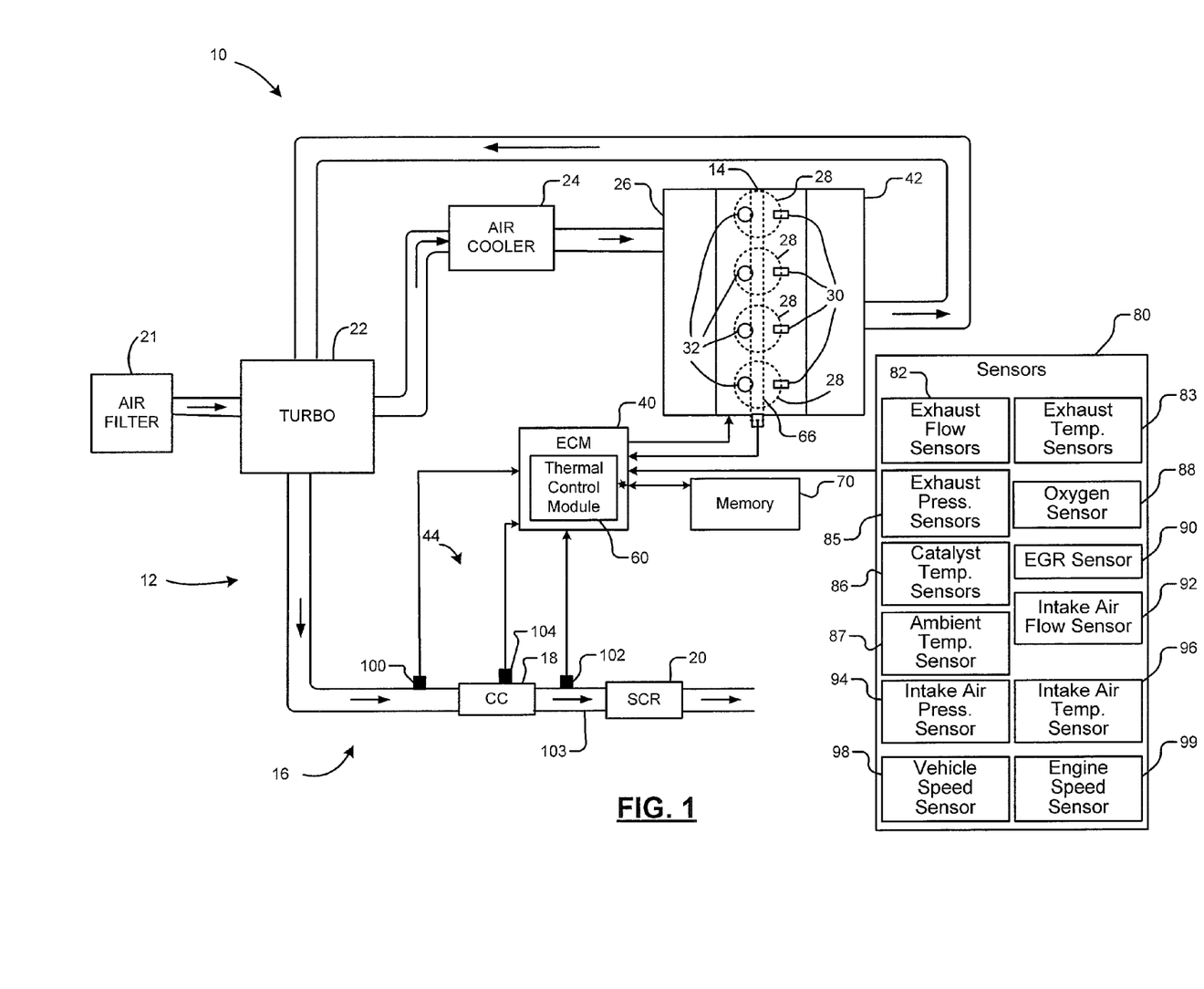
FIG. 1 a functional block diagram of an engine system incorporating a thermal management system in accordance with the present disclosure.
Figure 2:
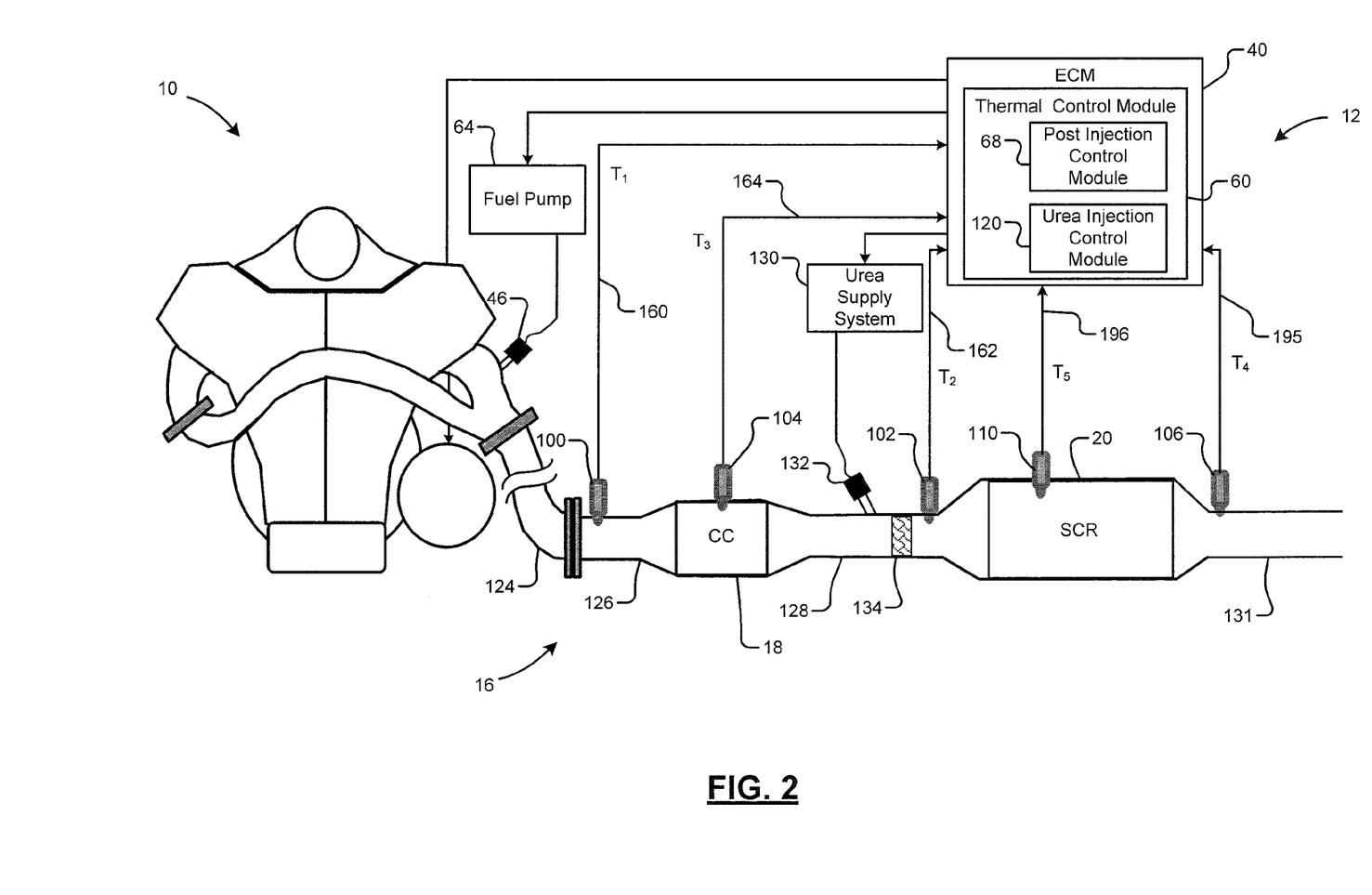
FIG. 2 is a functional block diagram of the thermal management system of FIG. 1.

In FIGS. 1 and 2, an engine system 10 and a thermal management system 12 are shown. The engine system 10 is a low emissions vehicle system that includes the thermal management system 12 and an engine 14 with an exhaust system 16. The exhaust system 16 includes a catalytic converter (CC) 18 and a selective catalytic reduction (SCR) catalyst 20. The thermal management system 12 maintains temperatures of the CC 18 and SCR catalyst 20 above respective light-off and/or minimum active operating temperatures.

The temperatures of the CC 18 and SCR catalyst 20 are maintained while permitting the engine 14 to operate with pre-combustion lean air and fuel (air/fuel) ratios. A lean air/fuel ratio may refer to an air/fuel ratio that is greater than a stoichiometric air/fuel ratio (e.g., 14.7:1). Temperatures of the engine 14 and/or portions of the exhaust system 16 (other than the CC 18 and SCR catalyst 20) may decrease to temperatures less than the light-off and/or minimum active operating temperatures when the engine 14 is operating with lean air/fuel ratios. Lean engine operation and reduced engine operating temperatures reduces heat losses and improves fuel economy.

The engine system 10 includes the engine 14 that combusts an air/fuel mixture to produce drive torque. Although the engine system 10 is shown as a spark ignition direct injection engine, the engine system 10 is provided as an example. The thermal management system 12 may be implemented on various other engine systems, such as stratified engine systems, port fuel injection systems, homogeneous charge compression ignition (HCCI) engine systems, etc. Stratified engine systems may refer to direct injection engine systems where fuel is ignited upon entering cylinders of an engine.

During operation, air enters the engine 14 by passing through an air filter 21 and may be drawn into a turbocharger 22. The turbocharger 22 when included compresses the fresh air. The greater the compression, the greater the output of the engine 14. The compressed air passes through an air cooler 24 when included before entering an intake manifold 26. Air within the intake manifold 26 is distributed into cylinders 28. Fuel may be directly injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The thermal management system 12 includes the exhaust system 16 and an engine control module (ECM) 40. The exhaust system 16 includes the CC 18, the SCR catalyst 20, the ECM 40, and an exhaust manifold 42. In the example shown, the exhaust system 16 includes in the following order: the exhaust manifold 42, a first exhaust conduit 124, a second exhaust conduit 126, the CC FWC 18, a third exhaust conduit 128, the underfloor FWC 20, a fourth exhaust conduit 131. The air pump is connected to the exhaust manifold. The oxygen sensor is connected to the exhaust manifold upstream from the air pump.

As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio in the exhaust system 16. The amount of oxidation increases the temperature of the exhaust. The SCR catalyst 20 may be used to further reduce $NO_x$. The SCR catalyst 20 converts $NO_x$ into nitrogen $N_2$ and water $H_2O$.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 21. Exhaust flows from the turbocharger 22 to the CC 18.

The thermal management system 12 may operate in various modes including a CC heating mode, a SCR heating mode, and a lean operating mode (or temperature maintaining mode). The modes may be initiated and controlled via the ECM 40 and/or a thermal control module 60, which may be incorporated as part of the ECM 40. The thermal control module 60 is part of the thermal management system 12 and is further described below with respect to FIGS. 3 and 4.

During the CC heating mode, the CC 18 is heated to at least a CC light-off temperature (e.g., 200-350° C.). In one implementation, the CC 18 is heated to at least 250° C. The ECM 40 and/or the thermal control module 60 may set the pre-combustion air/fuel ratio of the engine 14 to a stoichiometric ratio while retarding spark to heat the CC 18. This allows heat from the engine 14 to be transferred into the exhaust system 16 and heat the CC 18. Spark timing may be delayed from, for example, a spark time associated with top-dead-center (TDC) and/or a currently set spark time to retard spark. The currently set spark time may be prior to or subsequent to TDC.

During the SCR heating mode, the SCR catalyst 20 is heated to at least an active temperature (e.g., 200-350° C.). In one implementation, the SCR catalyst 20 is heated to at least 225° C. The ECM 40 and/or the thermal control module 60 may perform post fuel injection and/or inject fuel into the exhaust system 16 to heat the SCR catalyst 20. Post fuel injection may include injecting fuel into the cylinders 28 subsequent to ignition of air/fuel mixtures in the cylinders 28 and prior to intake strokes of the cylinders 28. This allows fuel to be passed into the exhaust system 16. A hydrocarbon (HC) injector 62 (shown in FIG. 2) may be used to inject fuel directly into the exhaust system 16. A thermal control module 60 may signal a fuel pump 64 to supply fuel to the HC injector 62. The HC injector 62 may inject fuel into the exhaust system 16, for example, between the engine 14 and the CC 18, as shown.

The fuel provided to the exhaust system 16 via post fuel injection and/or via the HC injector 62 may be ignited in, for example, the CC 18. Thermal energy generated by the ignition of the fuel heats the SCR catalyst 20. The post fuel injection and/or injection via the HC injector 62 may be controlled by a post injection control module 68 of the thermal control module 60. The SCR heating mode may not be performed while the CC heating mode is performed.

During the lean operating mode, the ECM 40 and/or the thermal control module 60 operates the engine 14 with pre-combustion lean air/fuel ratios. The CC heating mode and the SCR heating mode may not be performed while the lean operating mode is performed.

The ECM 40 and/or the thermal control module 60 may control the engine system 10 and the thermal management system 12 based on sensor information. The sensor information may be obtained directly via sensors and/or indirectly via algorithms, models and/or tables stored in memory 70. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, catalyst temperature sensors 86, an ambient temperature sensor 87, an oxygen sensor 88, an EGR sensor 90, an intake air flow sensor 92, an intake air pressure sensor 94, an intake air temperature sensor 96, vehicle speed sensor 98 and an engine speed sensor 99 are shown.

A first exhaust flow, pressure and/or temperature sensor 100 may be connected to the second exhaust conduit 126 and upstream from the CC 18. A second exhaust flow, pressure and/or temperature sensor 102 may be connected to the third exhaust conduit 128 downstream from the CC 18. A first catalyst temperature sensor 104 may be connected to the CC 18. A third exhaust flow, pressure and/or temperature sensor 106 may be connected to a fourth exhaust conduit 131 downstream from the SCR catalyst 20. A second catalyst temperature sensor 110 may be connected to the SCR catalyst 20. The ECM 40 and the thermal control module 60 may control operation of the catalyst heating system 12 and the engine 14 based on the information from the sensors 80, 100, 102, 104, 106 and 110.

The thermal control module 60 may include a urea injection control module 120 that controls injection of a reductant upstream from the SCR catalyst 20. For example only, the reductant may include anhydrous ammonia, aqueous ammonia or urea. The exhaust system 16 may include a urea supply system 130 that provides the reductant to a urea injector 132. The urea injector 132 may inject urea directly into the exhaust system 16, for example, between the CC 18 and a mixer 134 and/or between the CC 18 and the SCR catalyst 20. The mixer 134 is located in the second exhaust conduit 103.

Figure 3:
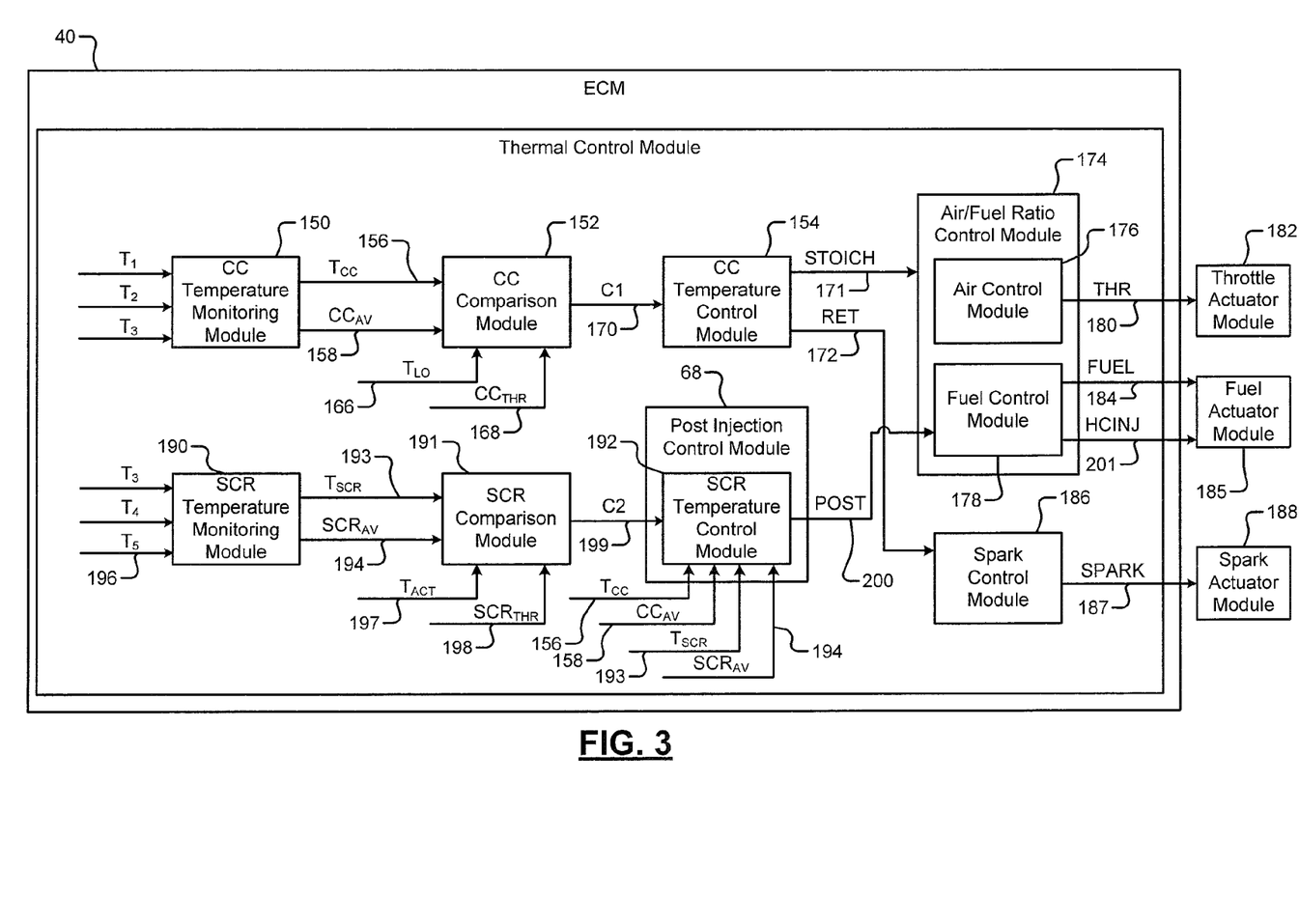
FIG. 3 is a functional block diagram of an engine control module incorporating a thermal control module in accordance with the present disclosure.

Referring now also to FIG. 3, the ECM 40 including the thermal control module 60 is shown. The thermal control module 60 includes a CC temperature monitoring module 150, a CC comparison module 152 and a CC temperature control module 154. The CC temperature monitoring module 150 may determine an operating and/or average temperature (CC temperature) $T_{CC}$ (156) and/or an active volume $CC_{AV}$ (158) of the CC 18. The active volume $CC_{AV}$ refers to the volume of the CC 18 that is active (i.e. has a temperature that is greater than a light-off temperature). The CC temperature $T_{CC}$ and/or an active volume $CC_{AV}$ may be determined based on, for example, temperature signals T1-T3 (160-164) from the sensors 100, 102, 104, an engine model, an algorithm, etc.

As an example, the CC temperature monitoring module 150 may estimate the CC temperature $T_{CC}$ and/or the active volume $CC_{AV}$ using a first thermal model and based on engine parameters and/or exhaust temperatures, some of which are described below with respect to equations 1 and 2. The CC temperature monitoring module may directly determine the CC temperature $T_{CC}$ via the sensors 100, 102, 104. The first thermal model may include equations, such as equations 1 and 2.

$$T_{CC} = f \left\{ \begin{array}{l} F_{CCRate}, S_{ENG}, CC_{Mass}, CC_{IMP}, T_{EXH}, DC, \\ E_{RunTime}, E_{Load}, T_{AMB}, CAM, SPK \end{array} \right\} \quad (1)$$

$$CC_{AV} = f \left\{ \begin{array}{l} T_{CC}, F_{CCRate}, S_{ENG}, CC_{Mass}, CC_{IMP}, T_{EXH}, DC, \\ E_{RunTime}, E_{Load}, T_{AMB}, CAM, SPK \end{array} \right\} \quad (2)$$

$F_{CCRate}$ is exhaust flow rate through the CC 18, which may be a function of mass air flow and fuel quantity supplied to the cylinders 28. The mass air flow may be determined by a mass air flow sensor, such as the intake air flow sensor 92. $S_{ENG}$ is speed of the engine 14 (i.e. rotational speed of a crankshaft of the engine 14). DC is duty cycle of the engine 14. $CC_{Mass}$ is mass of the CC 18. $CC_{IMP}$ is resistance or impedance of the CC 18. $E_{RunTime}$ is time that the engine 14 is activated (ON). $E_{Load}$ is current load on the engine 14. $T_{EXH}$ may refer to a temperature of the exhaust system 16, and based on one or more of the sensors 100, 102, 104. $T_{amb}$ is ambient temperature. CAM is cam phasing of the engine 14. SPK is spark timing. The CC temperature $T_{CC}$ and/or the active volume $CC_{AV}$ may be based on one or more of the engine system parameters provided in equations 1 and 2 and/or other engine system parameters.

The CC comparison module 152 compares the CC temperature $T_{CC}$ to a catalyst light-off temperature $T_{LO}$ (166) and/or the active volume $CC_{AV}$ to a first catalyst threshold $CC_{THR}$ (168). The catalyst light-off temperature $T_{LO}$ and the first catalyst threshold $CC_{THR}$ may be predetermined and stored in the memory 70. The CC comparison module 152 generates a first comparison signal C1 (170) that indicates whether the CC temperature $T_{CC}$ is greater than the catalyst light-off temperature $T_{LO}$ and/or whether the active volume $CC_{AV}$ is greater than the first catalyst threshold $CC_{THR}$.

The CC temperature control module 154 determines whether to operate in the CC heating mode based on the first comparison signal C1. The CC temperature control module 154 may operate in the CC heating mode when the CC temperature $T_{CC}$ is greater than the catalyst light-off temperature $T_{LO}$ and/or when the active volume $CC_{AV}$ is greater than the first catalyst threshold $CC_{THR}$. The CC temperature control module 154 may generate and/or adjust a stoichiometric signal STOICH (171) and/or a retard spark signal RET (172) to request that the engine 14 operate with stoichiometric air/fuel ratios and that spark timing of the engine 14 be retarded.

The stoichiometric signal STOICH may be provided to an air/fuel ratio control module 174. The air/fuel ratio control module 174 includes an air control module 176 and a fuel control module 178. The air control module 176 generates an air control signal THR (180) based on the stoichiometric signal STOICH. The air control signal THR may be provided to, for example, a throttle actuator module 182 to control a position of a throttle plate and adjust the amount of air supplied to the cylinders 28. The fuel control module 178 generates a fuel control signal FUEL (184) based on the stoichiometric signal STOICH. The fuel control signal FUEL may be provided to a fuel actuator module 185 to adjust the amount of fuel supplied to the cylinders 28. The fuel actuator module 185 may control operation of the fuel injectors 30.

Each system that varies an engine parameter may be referred to as an actuator that receives an actuator value. For example, the throttle actuator module 182 may be referred to as an actuator and the throttle opening area may be referred to as the actuator value. The throttle actuator module 182 may achieve a throttle opening area by adjusting an angle of a blade of a throttle valve. The throttle actuator module 182 may monitor the position of the throttle valve using one or more throttle position sensors (not shown). The air control module 176 may output a desired area signal to the throttle actuator module 182 based on the stoichiometric signal STOICH. The throttle actuator module 182 then regulates the throttle valve to produce the desired throttle area.

The retard spark signal RET may be provided to a spark control module 186, which may generate a spark control (or timing) signal SPARK (187) based on the retard spark signal RET. The spark control signal SPARK may be provided to a spark actuator module 188. The spark actuator module 188 may be referred to as an actuator, while a corresponding actuator value may be the amount of spark retard relative to cylinder TDC and/or a current spark time of a cylinder. The spark actuator module controls operation of the spark plugs 32.

The thermal control module 60 further includes a SCR temperature monitoring module 190, a SCR comparison module 191 and a SCR temperature control module 192. The SCR temperature monitoring module 190 may determine an operating and/or average temperature (SCR temperature) $T_{SCR}$ (193) and/or an active volume $SCR_{AV}$ (194) of the SCR catalyst 20. The active volume $SCR_{AV}$ refers to the volume of the SCR catalyst 20 that is active (i.e. has a temperature that is greater than a light-off temperature). The SCR temperature $T_{SCR}$ and/or an active volume $SCR_{AV}$ may be determined based on, for example, temperature signals T3-T5 (164, 195, 196) from the sensors 102, 106, 110 an engine model, an algorithm, etc.

As an example, the SCR temperature monitoring module 190 may estimate the SCR temperature $T_{SCR}$ and/or the active volume $SCR_{AV}$ using a second thermal model and based on engine parameters and/or exhaust temperatures, some of which are described below with respect to equations 3 and 4. The SCR temperature monitoring module 190 may directly determine the SCR temperature $T_{SCR}$ via the sensors 102, 106, 110. The second thermal model may include equations, such as equations 3 and 4.

$$T_{SCR} = f\left\{\begin{array}{l}F_{SCRRate}, S_{ENG}, SCR_{Mass}, SCR_{IMP}, T_{EXH}, DC,\\ E_{RunTime}, E_{Load}, T_{AMB}, CAM, SPK\end{array}\right\} \quad (3)$$

$$CC_{AV} = f\left\{\begin{array}{l}T_{SCR}, F_{SCRRate}, S_{ENG}, SCR_{Mass}, SCR_{IMP}, T_{EXH}, DC,\\ E_{RunTime}, E_{Load}, T_{AMB}, CAM, SPK\end{array}\right\} \quad (4)$$

$F_{SCRRate}$ is exhaust flow rate through the SCR catalyst 20, which may be a function of mass air flow and fuel quantity supplied to the cylinders 28. $SCR_{Mass}$ is mass of the SCR catalyst 20. $SCR_{IMP}$ is resistance or impedance of the SCR catalyst 20. $T_{EXH}$ may refer to a temperature of the exhaust system 16, and based on one or more of the sensors 102, 106, 110. The SCR temperature $T_{SCR}$ and/or the active volume $SCR_{AV}$ may be based on one or more of the engine system parameters provided in equations 3 and 4 and/or other engine system parameters.

The SCR comparison module 191 compares the SCR temperature $T_{SCR}$ to an active temperature $T_{ACT}$ (197) and/or the active volume $SCR_{AV}$ (198) to a second catalyst threshold $SCR_{THR}$. The active temperature $T_{ACT}$ and/or the active volume $SCR_{AV}$ may be predetermined and stored in the memory 70. The SCR comparison module 191 generates a second comparison signal C2 (199) that indicates whether the SCR temperature $T_{SCR}$ is greater than the active temperature $T_{ACT}$ and/or whether the active volume $SCR_{AV}$ is greater than the second catalyst threshold $SCR_{THR}$.

The SCR temperature control module 192 may be part of the post injection control module 68 and determines whether to operate in the SCR heating mode based on the second comparison signal C2. The SCR temperature control module 192 may operate in the SCR heating mode when the SCR temperature $T_{SCR}$ is greater than the active temperature $T_{ACT}$ and/or when the active volume $SCR_{AV}$ is greater than the second catalyst threshold $SCR_{THR}$. The SCR temperature control module 192 may generate and/or adjust a post injection signal POST (200) to request that the engine 14 perform post injection and/or that the HC injector 62 inject fuel directly into the exhaust system 16.

The post injection signal POST may be provided to the air/fuel ratio control module 174 and/or the fuel control module 178. The fuel control module 178 generates the fuel control signal FUEL based on the post injection signal POST. The fuel control signal FUEL and/or a HC injection signal HCINJ (201) may be provided to the fuel actuator module to adjust the amount of fuel provided to the exhaust system 16.

The amount of fuel provided to the exhaust system 16 during post fuel injection and/or by the HC injector 62 may be limited based on and/or as a function of the CC temperature $T_{CC}$, the SCR temperature $T_{SCR}$, and/or the active volumes $CC_{AV}$, $SCR_{AV}$. This provides closed-loop control of fuel injected into the exhaust system 16.

As another example, the SCR temperature $T_{SCR}$ may be determined based on a temperature gradient across the SCR. The CC temperature monitoring module 150 determines a temperature gradient across the SCR catalyst 20 based on the temperature signals T1, T2 from the temperature sensors 102, 106. For example, the CC temperature monitoring module 150 may determine a difference between the first temperature signal T1 and the second temperature signal T2, as provided by equation 5.

$$GRAD = T1 - T2 \quad (5)$$

A weighted average value WA may be generated as a function of the temperature signals T1 T2. As an alternative, the weighted average value WA may be a weighted average of the temperature signals T1, T2. An example of the weighted average value WA is provided by equation 6, where x is a calibrated value between 0 and 1. The calibrated value x may be calibrated based on, for example, thermocouple data of tested and/or modeled catalysts.

$$WA = [(x)T1 + (1-x)T2] \quad (6)$$

The weighted average value WA indicates an average temperature of the SCR catalyst 20. The active volume $SCR_{AV}$ of the SCR catalyst 20 may be determined based on the temperature signals T1, T2, the weighted average value WA, and/or other parameters. The active volume $SCR_{AV}$ of the SCR catalyst 20 may be determined based on, for example, mass, resistance and/or impedance of the SCR catalyst 20, ambient temperature, engine speed, camshaft phasing, ignition timing, duty cycle of the engine, etc., as described above.

A temperature gradient across the CC 18 may also be determined to determine the CC temperature $T_{CC}$ using sensors 100 and 102. The active volume $CC_{AV}$ of the CC 18 may be determined based on the temperature signals of the sensors 100, 102, the weighted average value determined therefrom, and/or other parameters (some of which are stated above).

Figure 4:
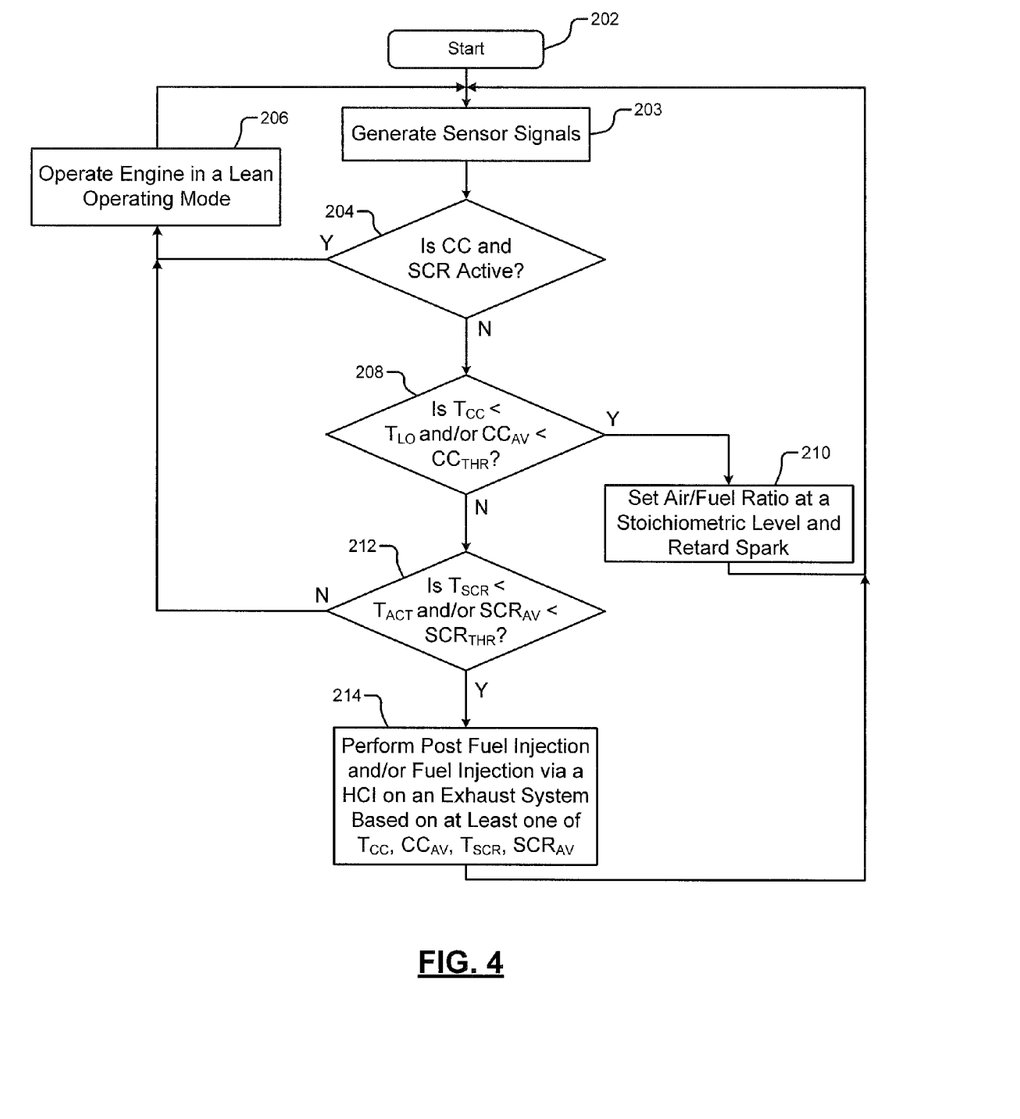
FIG. 4 is a logic flow diagram of a thermal control method in accordance with the present disclosure.

The thermal management system 12 may be operated using numerous methods, an example method is provided by the method of FIG. 4. In FIG. 4, a thermal control method is shown. Although the following tasks are primarily described with respect to the implementations of FIGS. 1-3, the tasks may be easily modified to apply to other implementations of the present disclosure. The tasks may be iteratively performed. The method may begin at 202.

At 203, sensor signals are generated. For example, the sensors 80, 100, 102, 104, 106, 110 may generate respective sensor signals.

At 204, the thermal control module 60 determines whether the CC 18 and the SCR catalyst 20 are active. Task 206 is performed when both the CC 18 and the SCR catalyst 20 are active, otherwise task 208 is performed. The CC temperature control module may determine if the CC 18 is active based on the first comparison signal. The SCR temperature control module may determine whether the SCR catalyst 20 is active based on the second comparison signal.

At 206, the engine 14 is operated in the lean operating mode. As an example, during lean operation of the engine 14, the fuel control module may operate in an air lead mode in which the air/fuel ratio control module attempts to maintain a stoichiometric air/fuel ratio by controlling fuel flow based on air flow. The air/fuel ratio control module and/or the fuel control module may determine a fuel mass that will yield stoichiometric combustion when combined with the current amount of air per cylinder. The fuel control module may instruct the fuel actuator module based on a fueling rate to inject a selected fuel mass into each activated cylinder of the engine 14. Task 203 is performed subsequent to task 206.

At 208, the CC comparison module determines whether the CC temperature $T_{CC}$ is less than the catalyst light-off temperature $T_{LO}$ (or within a first predetermined temperature range) and/or whether the active volume $CC_{AV}$ is less than the first catalyst threshold $CC_{THR}$. Task 210 is performed when the CC temperature $T_{CC}$ is less than the catalyst light-off temperature $T_{LO}$ (or within the first predetermined temperature range) and/or when the active volume $CC_{AV}$ is less than the first catalyst threshold $CC_{THR}$, otherwise task 212 is performed.

At 210, the air/fuel ratio control module, the air control module and/or the fuel control module generates the air control signal THR and the fuel control signal FUEL to operate the engine 14 with stoichiometric ratios. The spark control module generates the spark control signal SPARK to retard spark timing of the engine 14 from TDC and/or from a current spark time. Task 203 is performed subsequent to task 210.

Retarding spark of the engine 14 may include delaying spark timing a predetermined amount (or number of degrees) from a predetermined or current spark time (or predetermined number of degrees from TDC). The predetermined or current spark time may be an advanced time (time prior to TDC), a time corresponding to TDC or a time subsequent to TDC. Retarded timing can be defined as changing the timing such that fuel ignition happens later in a combustion cycle.

Task 212 may be performed when the CC 18 is active. At 212, the SCR comparison module determines whether the SCR temperature $T_{SCR}$ is less than the active temperature $T_{ACT}$ (or within a second predetermined temperature range) and/or whether the active volume $SCR_{AV}$ is less than the second catalyst threshold $SCR_{THR}$. Task 214 is performed when the SCR temperature $T_{SCR}$ is less than the active temperature $T_{ACT}$ (or within the second predetermined temperature range) and/or when the active volume $SCR_{AV}$ is less than the second catalyst threshold $SCR_{THR}$, otherwise task 203 is performed.

At 214, the air/fuel ratio control module and/or the fuel control module performs post injection and/or directly injects fuel into the exhaust system 16 via the HC injector 62. The amount of fuel provided to the exhaust system 16 may be ramped up to a predetermined level and limited as described above. This is performed to increase temperature of the SCR catalyst 20. Task 203 may be performed subsequent to task 214.

The above-described tasks are meant to be illustrative examples; the tasks may be performed sequentially, synchronously, simultaneously, continuously, during overlapping time periods or in a different order depending upon the application. In one implementation, task 204 is not performed and task 208 is performed subsequent to task 202.

The above described implementations maximize fuel efficient operation by providing targeted catalyst heating while allowing an engine to operate with increased lean air/fuel ratios. Temperatures of a catalytic converter and/or SCR catalyst are maintained while allowing temperatures of an engine and/or upstream portions of an exhaust system to decrease. The increased lean air/fuel ratios and decreased operating temperatures decreases fuel consumption and heat losses associated with operation of the engine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal management system comprising:
a first electronic circuit configured to determine whether a catalytic converter is active;
a second electronic circuit configured to determine whether a SCR catalyst is active; and
a third electronic circuit configured to adjust an air and fuel ratio of an engine to operate at a stoichiometric ratio and retard spark of the engine when the catalytic converter is not active, wherein the third electronic circuit does not perform post fuel injection while the catalytic converter and the SCR catalyst are not active, wherein the third electronic circuit is configured to at least one of determine a first active volume of the catalytic converter and whether the catalytic converter is active based on the first active volume of the catalytic converter, and determine a second active volume of the SCR catalyst and whether the catalytic converter is active based on the second active volume of the SCR catalyst, wherein the third electronic circuit is configured to
perform the post fuel injection in response to the catalytic converter being active and the SCR catalyst not being active,
determine a weighted average based on a plurality of temperatures,
determine the second active volume of the SCR catalyst based on the weighted average, and
perform the post fuel injection in response to the second active volume of the SCR catalyst.

2. The thermal management system of claim 1, wherein the third electronic circuit is configured to operate the engine with lean air and fuel ratios when the catalytic converter and the SCR catalyst are active.

3. The thermal management system of claim 1, wherein the first electronic circuit is a same electronic circuit as at least one of the second electronic circuit and the third electronic circuit.

4. The thermal management system of claim 1, wherein the third electronic circuit is configured to:
determine a temperature gradient across the SCR catalyst based on the plurality of temperatures;
determine a temperature of the SCR catalyst based on the temperature gradient;
determine the second active volume of the SCR catalyst based on the plurality of temperatures; and
perform the post fuel injection in response to the temperature of the SCR catalyst.

5. The thermal management system of claim 1, further comprising:
a fourth electronic circuit configured to determine at least one of a first temperature of the catalytic converter and the first active volume of the catalytic converter;
a fifth electronic circuit configured to determine at least one of a second temperature of the SCR catalyst and the second active volume of the SCR catalyst; and
a sixth electronic circuit configured to adjust the air and fuel ratio of the engine to operate at the stoichiometric ratio and retard the spark of the engine based on (i) the at least one of the first temperature and the first active volume and (ii) the at least one of the second temperature and the second active volume.

6. The thermal management system of claim 1, further comprising:
a fourth electronic circuit configured to determine at least one of a temperature of the SCR catalyst and the second active volume of the SCR catalyst,
wherein the second electronic circuit is configured to generate a comparison signal based on at least one of a comparison between the temperature and an active temperature and a comparison between the second active volume and a threshold; and
a fifth electronic circuit configured to generate a post injection signal to provide fuel to an exhaust system of the engine based on the comparison signal,
wherein the fifth electronic circuit is configured to limit an amount of fuel provided to the exhaust system based on at least one of the temperature of the SCR catalyst and the second active volume.

7. The thermal management system of claim 1, further comprising:
a fourth electronic circuit configured to determine at least one of a first temperature of the catalytic converter and the first active volume of the catalytic converter,
wherein the first electronic circuit is configured to generate a first comparison signal based on at least one of a comparison between the first temperature and a light-off temperature and a comparison between the first active volume and a first threshold; and
a fifth electronic circuit configured to request that the engine operate at stoichiometry and spark of the engine be retarded based on the first comparison signal.

8. The thermal management system of claim 7, wherein the third electronic circuit is configured to operate the engine at stoichiometric air and fuel ratios and retard spark of the engine when at least one of the first temperature is less than the light-off temperature and the first active volume is less than the first threshold.

9. The thermal management system of claim 7, further comprising:
a sixth electronic circuit configured to determine at least one of a second temperature of the SCR catalyst and the second active volume of the SCR catalyst,
wherein the second electronic circuit is configured to generate a second comparison signal based on at least one of a comparison between the second temperature and an active temperature and a comparison between the second active volume and a second threshold; and
a seventh electronic circuit configured to generate a post injection signal to provide fuel to an exhaust system of the engine based on the second comparison signal.

10. The thermal management system of claim 9, wherein the third electronic circuit is configured to control an injector to inject fuel to the exhaust system when at least one of the second temperature is less than the active temperature and the second active volume is less than the second threshold.

11. The thermal management system of claim 9, wherein the seventh electronic circuit is configured to limit an amount of fuel provided to the exhaust system based on at least one of the first temperature and the first active volume and at least one of the second temperature and the second active volume.

12. The thermal management system of claim 9, wherein each of the first electronic circuit, the second electronic circuit, the third electronic circuit, the fourth electronic circuit, the fifth electronic circuit, the sixth electronic circuit, and the seventh electronic circuit includes at least one of an electronic circuit, an application specific integrated circuit, a processor, memory, and a combinational logic circuit.

13. A thermal control method comprising:
determining whether a catalytic converter is active;
determining whether a selective catalytic reduction (SCR) catalyst is active;
refraining from performing post fuel injection while the catalytic converter and the SCR catalyst are not active;
at least one of
determining a first active volume of the catalytic converter and whether the catalytic converter is active based on the first active volume of the catalytic converter, and
determining a second active volume of the SCR catalyst and whether the catalytic converter is active based on the second active volume of the SCR catalyst;
adjusting an air and fuel ratio of an engine to operate at a stoichiometric ratio and retarding spark of the engine when the catalytic converter is not active;

directly injecting fuel into an exhaust system of the engine in response to the catalytic converter being active and the SCR catalyst not being active;

determining a weighted average based on a plurality of temperatures;

determining the second active volume of the SCR catalyst based on the weighted average; and perform the post fuel injection in response to the second active volume of the SCR catalyst.

14. The thermal control method of claim 13, further comprising operating the engine with lean air and fuel ratios when the catalytic converter and the SCR catalyst are active.

15. The thermal control method of claim 13, further comprising:

determining a first temperature of the catalytic converter and the first active volume of the catalytic converter;

determining a second temperature of the SCR catalyst and the second active volume of the SCR catalyst; and adjusting the air and fuel ratio of the engine to operate at the stoichiometric ratio and retarding the spark of the engine based on (i) the first temperature and the first active volume and (ii) the second temperature and the second active volume.

16. The thermal control method of claim 13, further comprising:

determining a temperature of the SCR catalyst and the second active volume of the SCR catalyst;

generating a comparison signal based on a comparison between the temperature and an active temperature and a comparison between the second active volume and a threshold;

generating a post injection signal to provide fuel to the exhaust system based on the comparison signal; and limiting the amount of fuel provided to the exhaust system based on the temperature of the SCR catalyst and the second active volume.

17. The thermal control method of claim 13, further comprising:

determining a first temperature of the catalytic converter and the first active volume of the catalytic converter;

generating a first comparison signal based on a comparison between the first temperature and a light-off temperature and a comparison between the first active volume and a first threshold;

requesting the engine operate at stoichiometry; and requesting spark of the engine be retarded based on the first comparison signal.

18. The thermal control method of claim 17, further comprising:

determining a second temperature of the SCR catalyst and the second active volume of the SCR catalyst;

generating a second comparison signal based on a comparison between the second temperature and an active temperature and a comparison between the second active volume and a second threshold; and generating a post injection signal to provide fuel to the exhaust system based on the second comparison signal.

19. The thermal control method of claim 18, wherein:

the engine is operated at stoichiometric air and fuel ratios and spark of the engine is retarded when the first temperature is less than the light-off temperature and the first active volume is less than the first threshold; and fuel is provided to the exhaust system when the second temperature is less than the active temperature and the second active volume is less than the second threshold.

20. The thermal control method of claim 18, further comprising limiting an amount of fuel provided to the exhaust system based on the first temperature and the first active volume and the second temperature and the second active volume.

* * * * *